July 28, 1964

J. MARTIN 3,142,552

MACHINE FOR FABRICATING SEAMLESS HIGH
OPTICAL QUALITY GLASS ARTICLES

Filed Oct. 30, 1959

INVENTOR
John Martin

BY Wenderoth, Lind & Ponack
ATTORNEYS

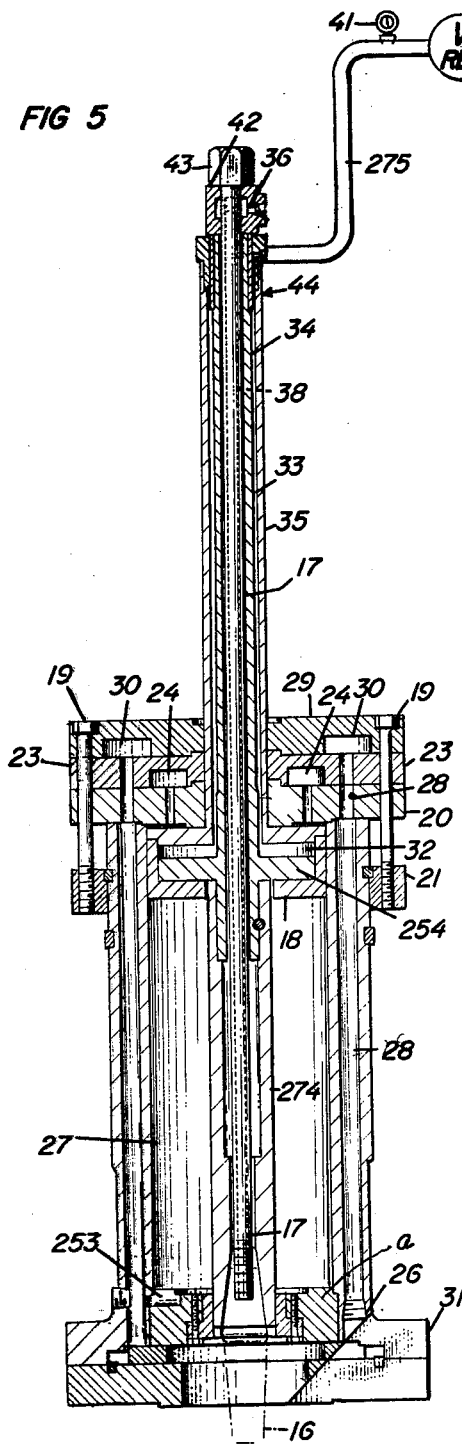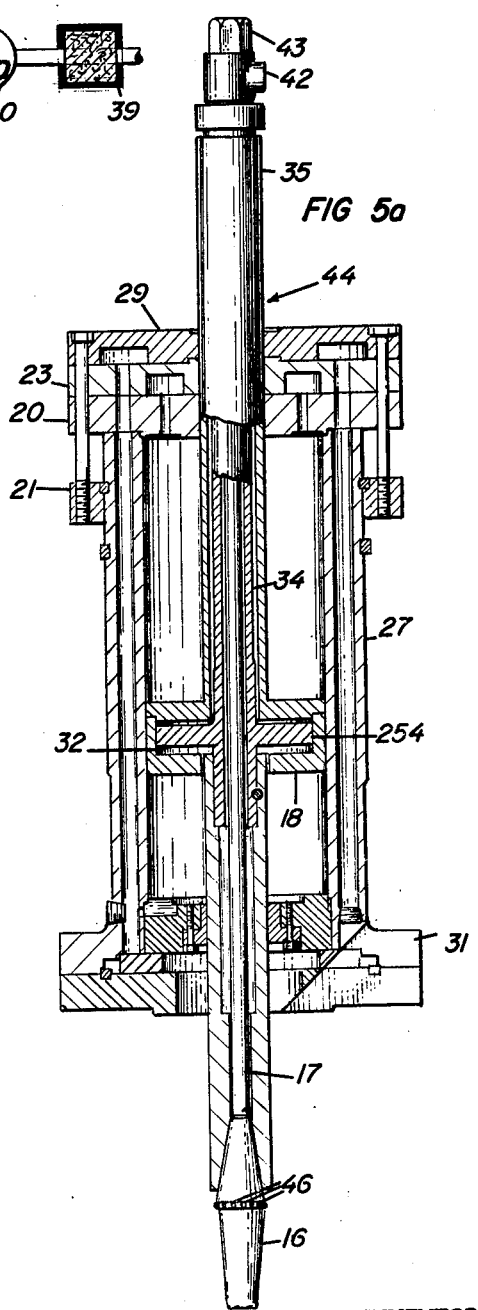

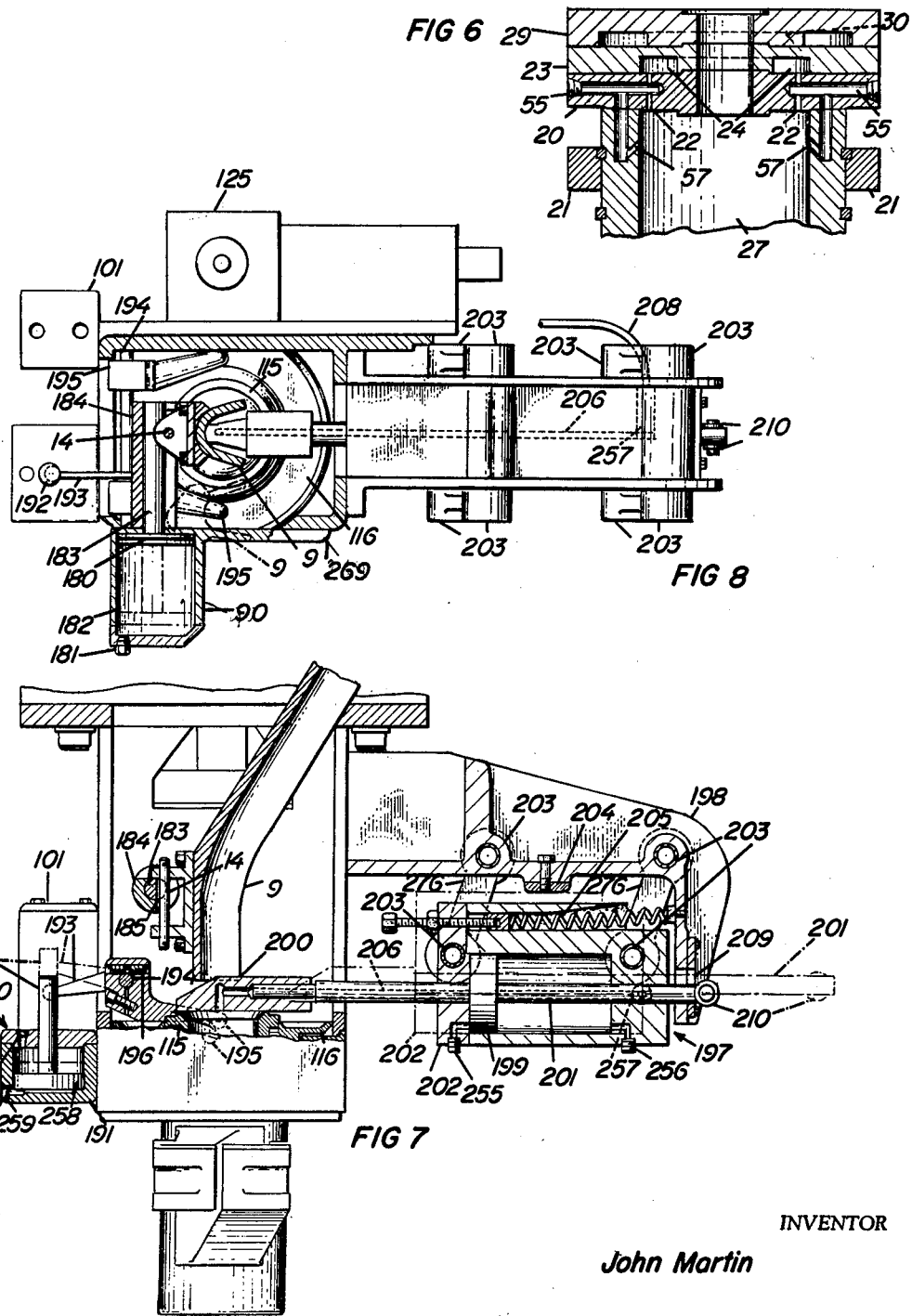

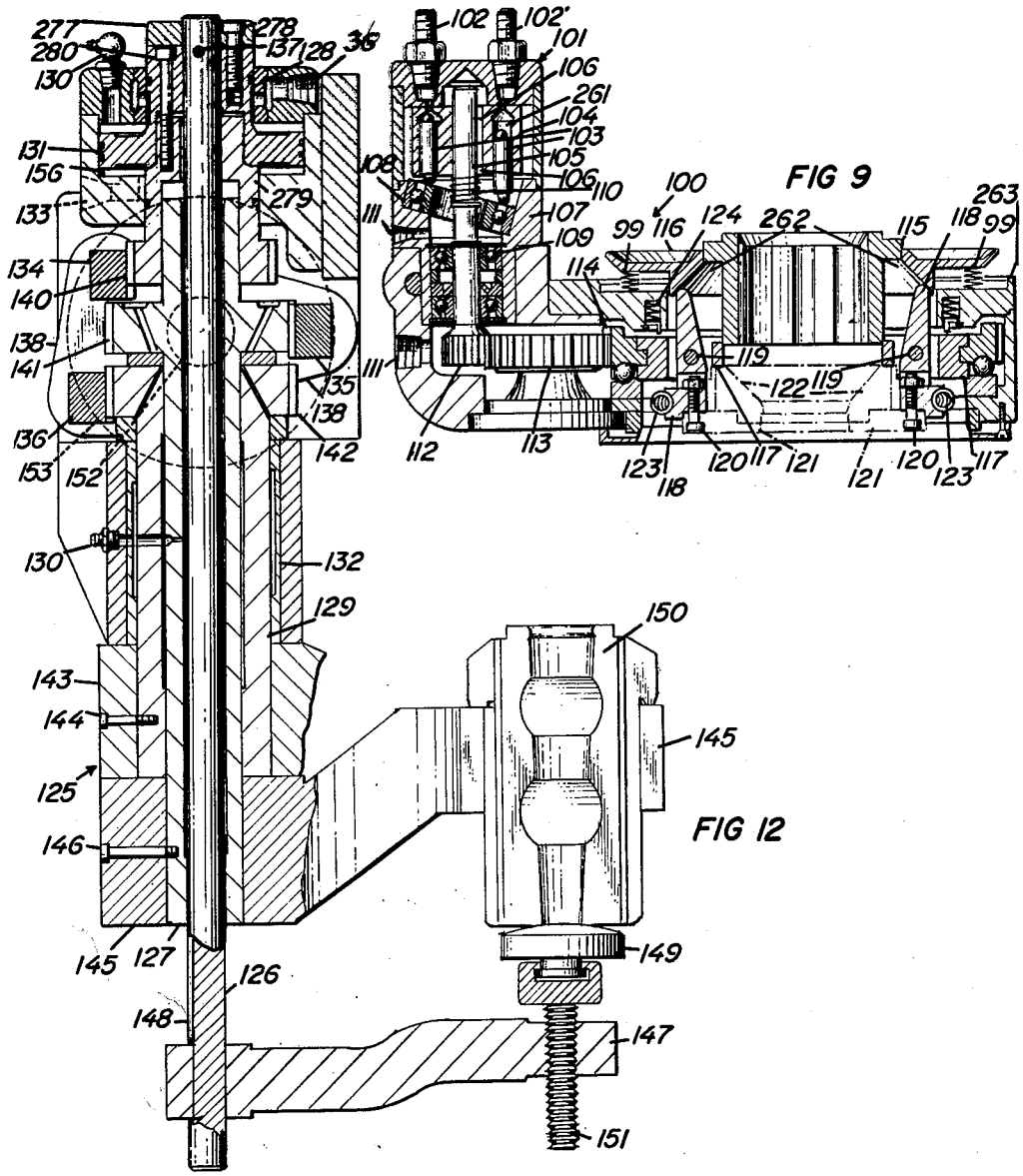
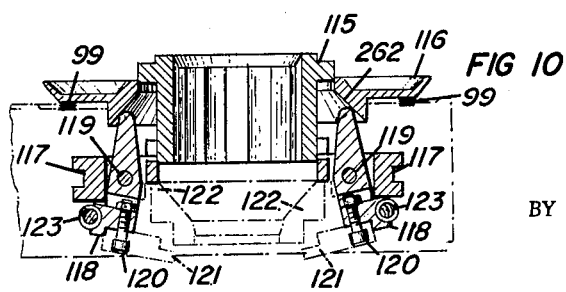
INVENTOR
John Martin

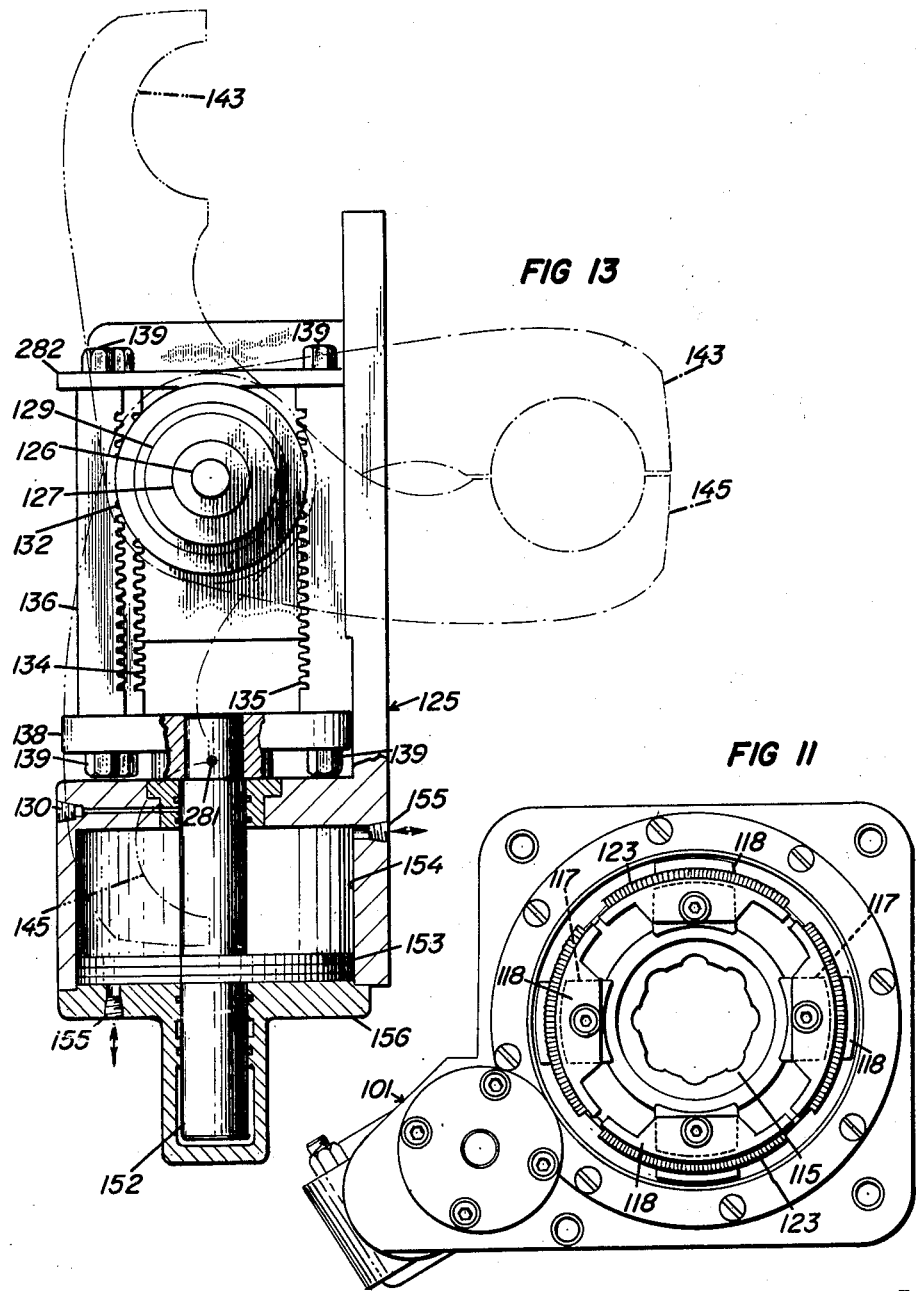

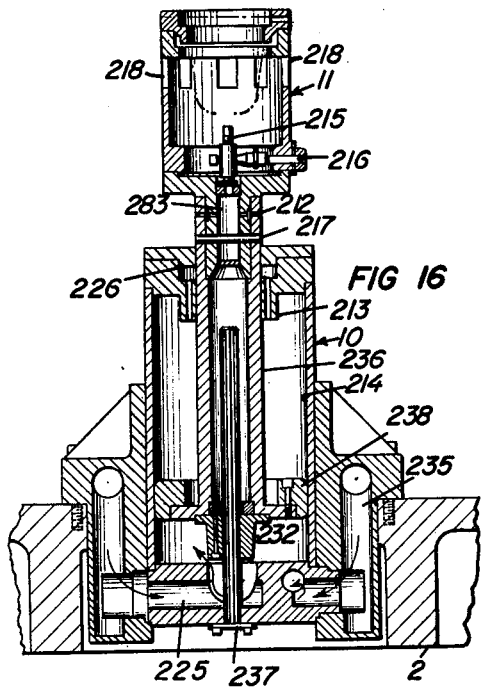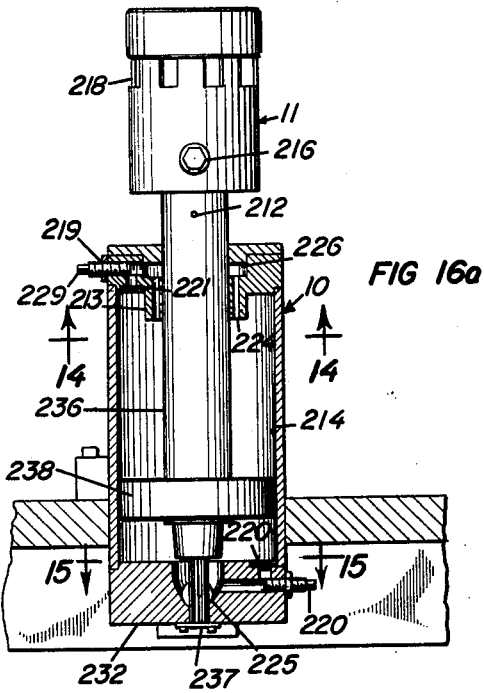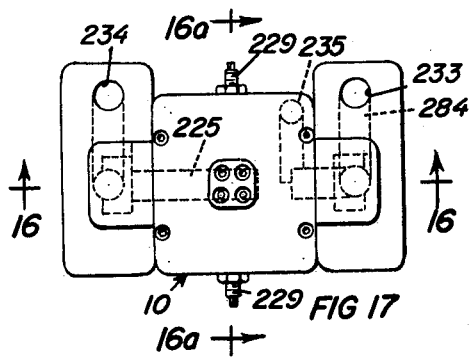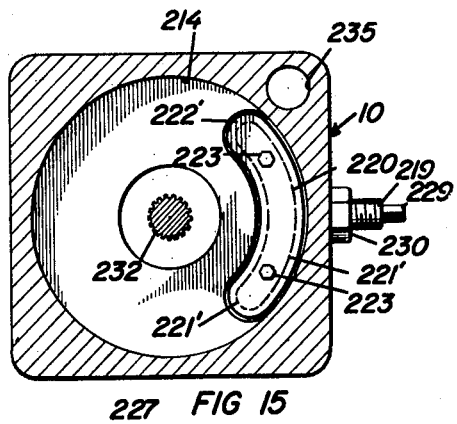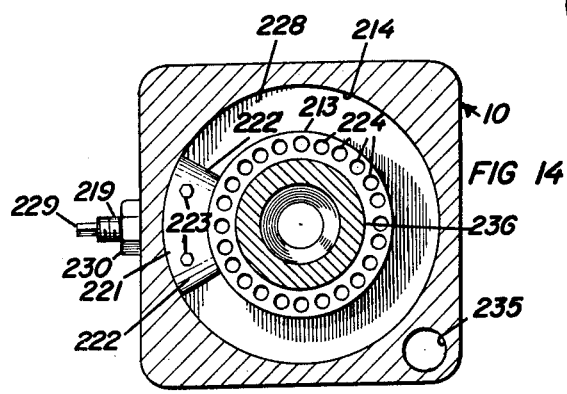

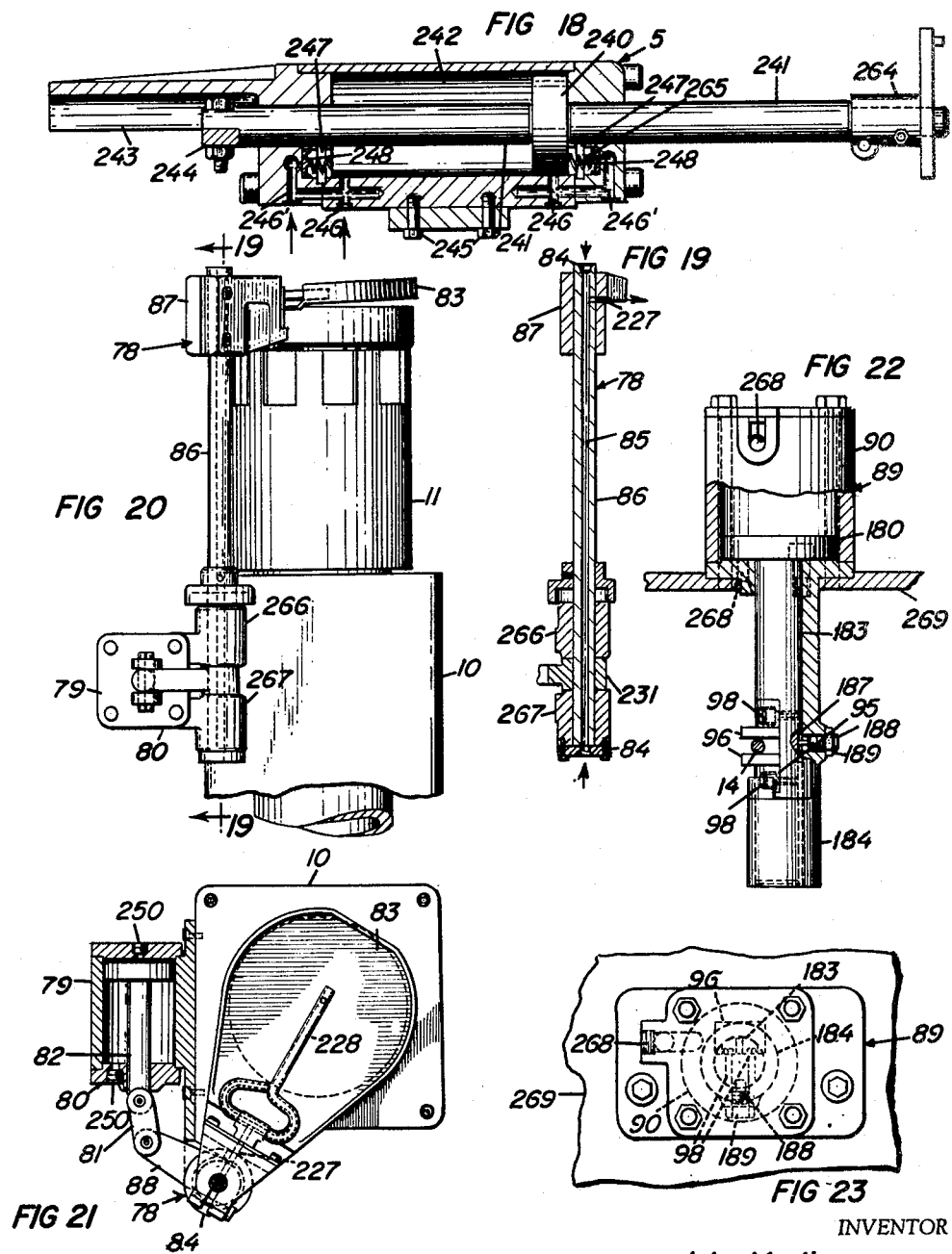

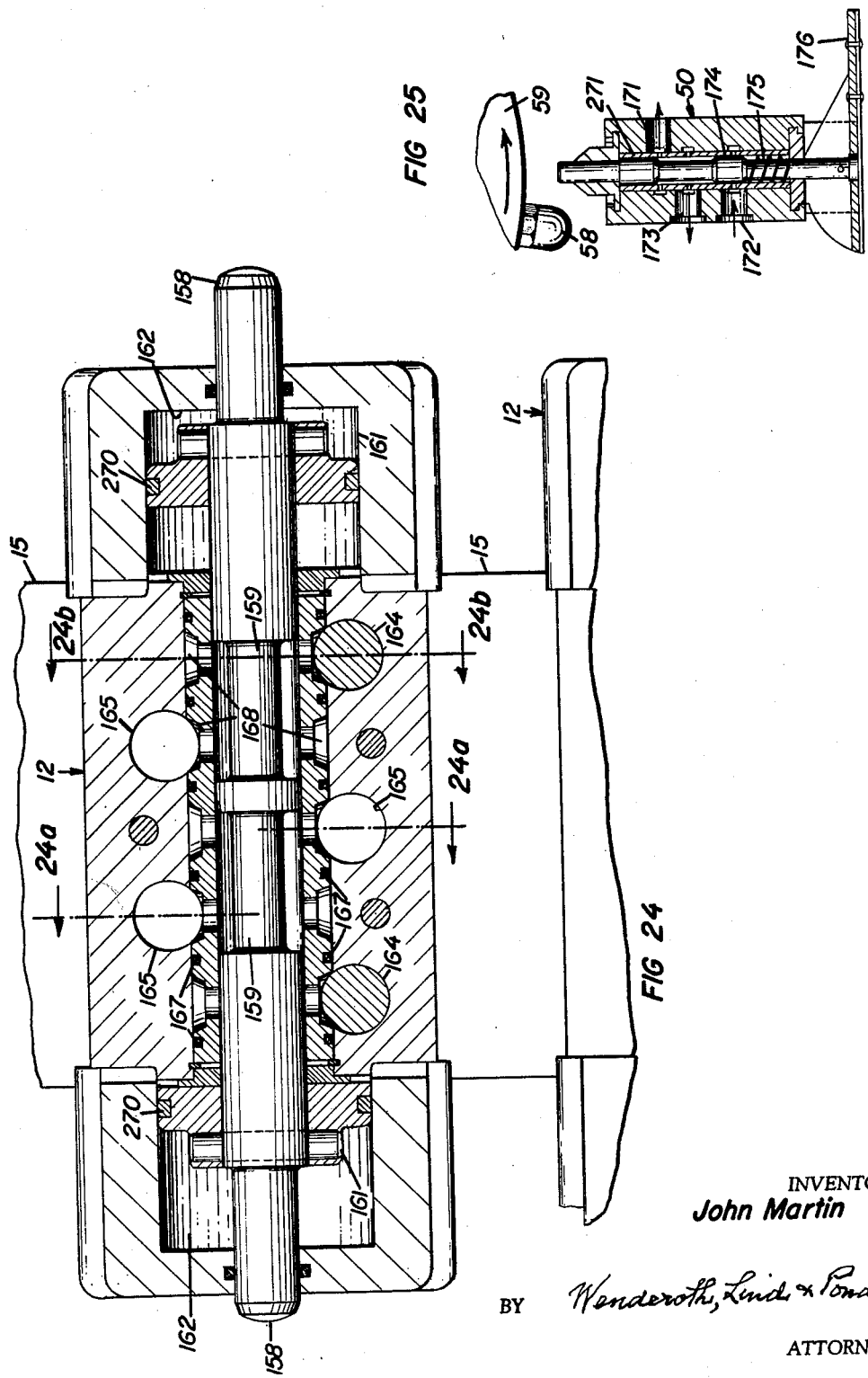

July 28, 1964  J. MARTIN  3,142,552
MACHINE FOR FABRICATING SEAMLESS HIGH
OPTICAL QUALITY GLASS ARTICLES
Filed Oct. 30, 1959  17 Sheets-Sheet 12
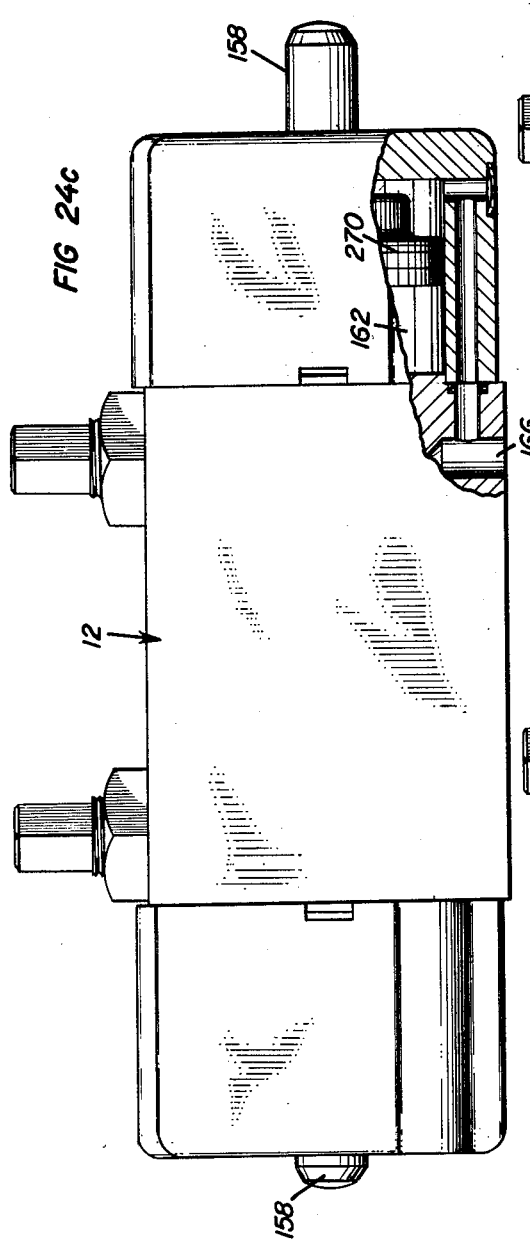
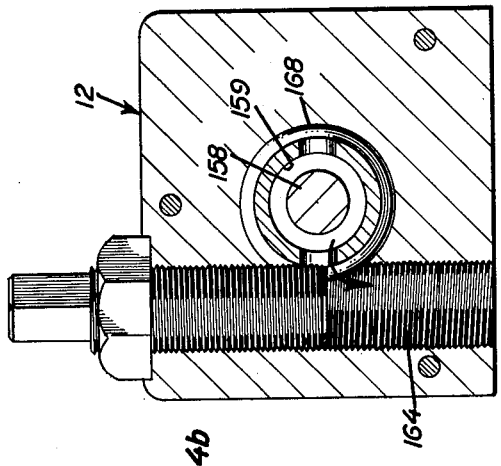
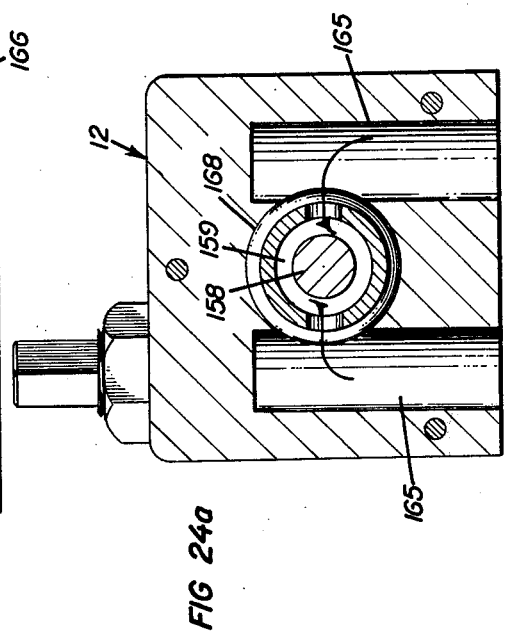
INVENTOR
John Martin
BY Wenderoth, Lind & Ponack
ATTORNEYS July 28, 1964

J. MARTIN 3,142,552

MACHINE FOR FABRICATING SEAMLESS HIGH
OPTICAL QUALITY GLASS ARTICLES

Filed Oct. 30, 1959

INVENTOR
John Martin

BY *Wenderoth, Lind & Ponack*

ATTORNEYS

July 28, 1964 J. MARTIN 3,142,552
MACHINE FOR FABRICATING SEAMLESS HIGH
OPTICAL QUALITY GLASS ARTICLES
Filed Oct. 30, 1959 17 Sheets-Sheet 14
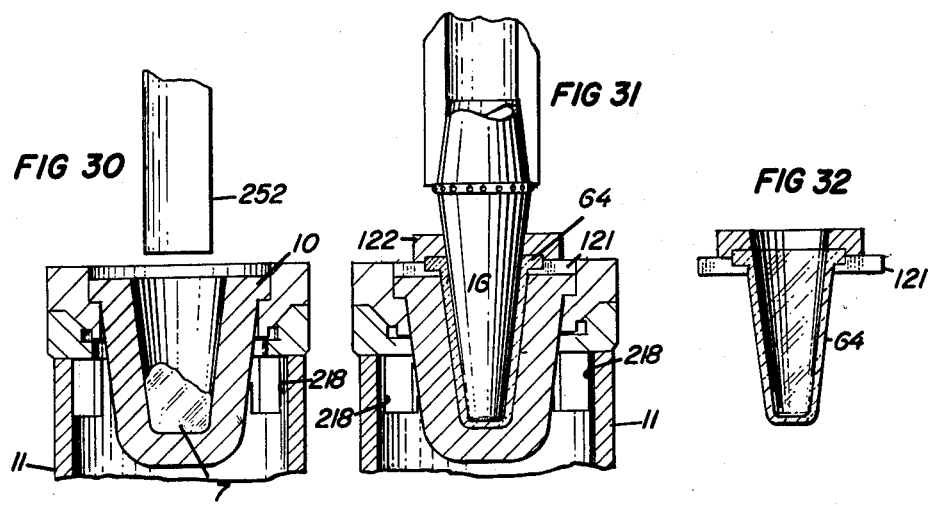
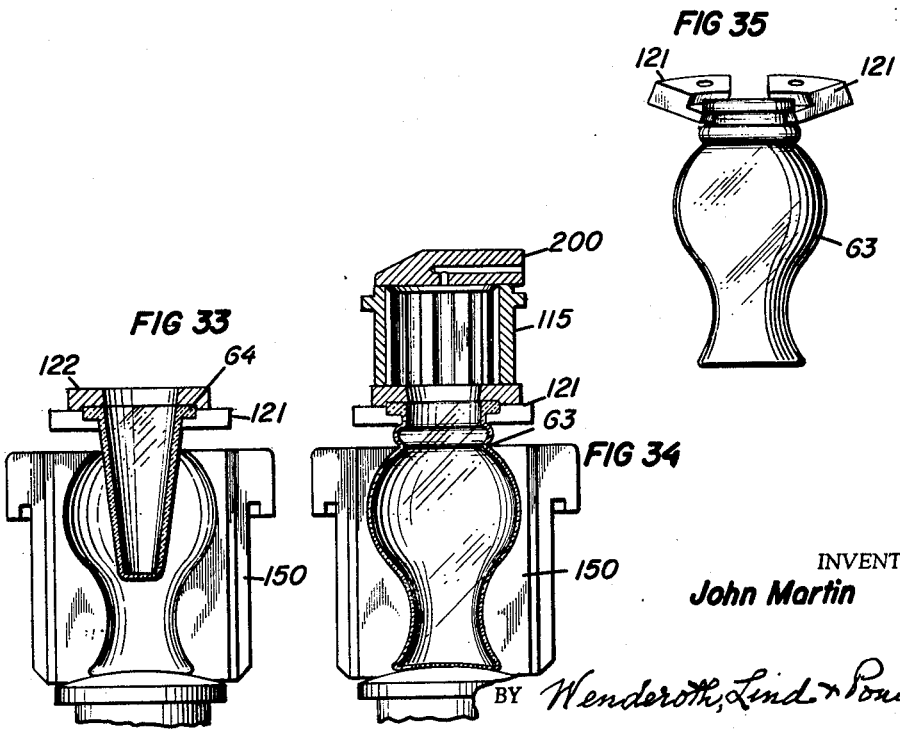
INVENTOR
John Martin
BY Wenderoth, Lind & Ponack
ATTORNEYS

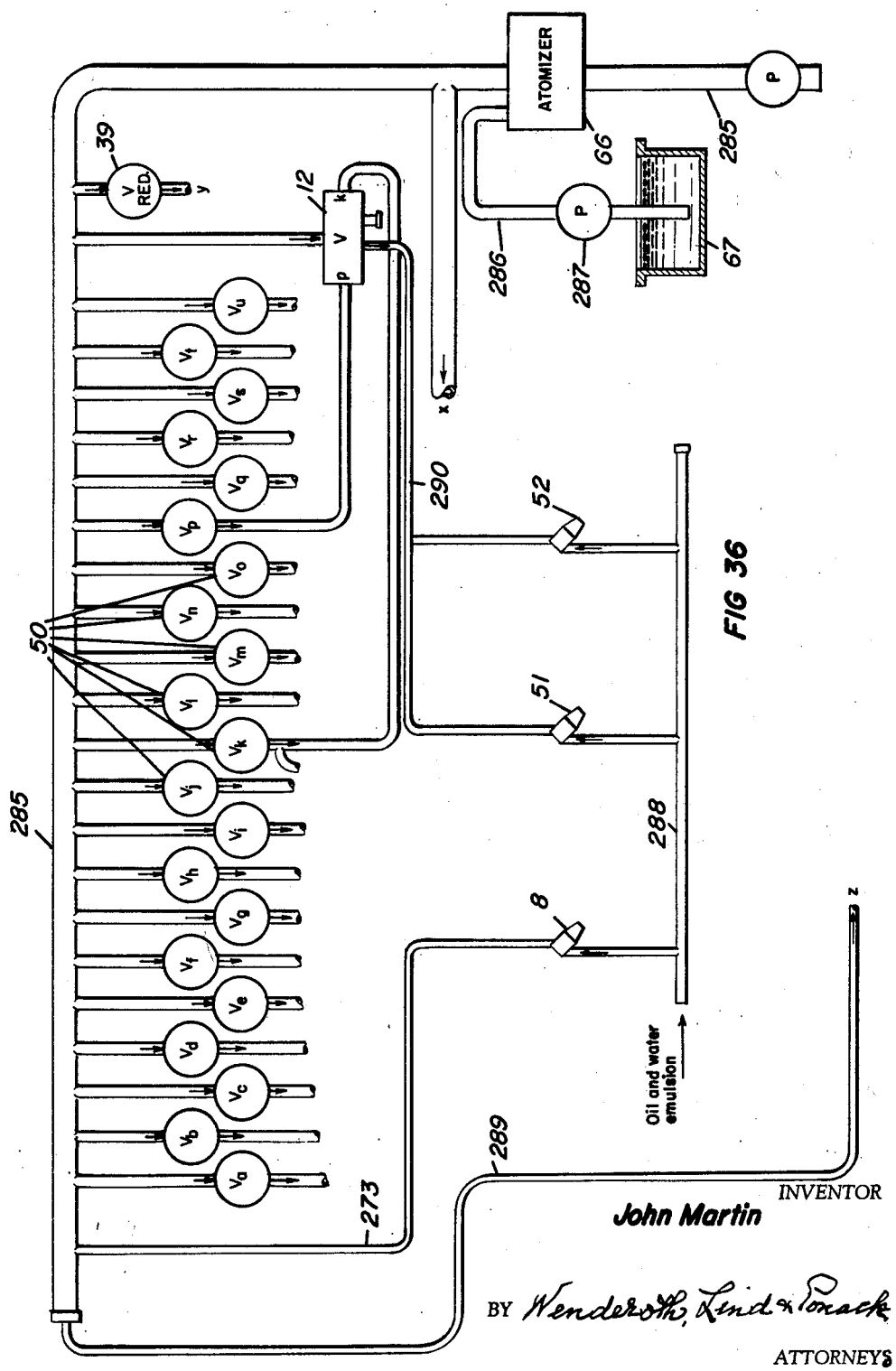

July 28, 1964
J. MARTIN
3,142,552
MACHINE FOR FABRICATING SEAMLESS HIGH
OPTICAL QUALITY GLASS ARTICLES
Filed Oct. 30, 1959
17 Sheets-Sheet 16
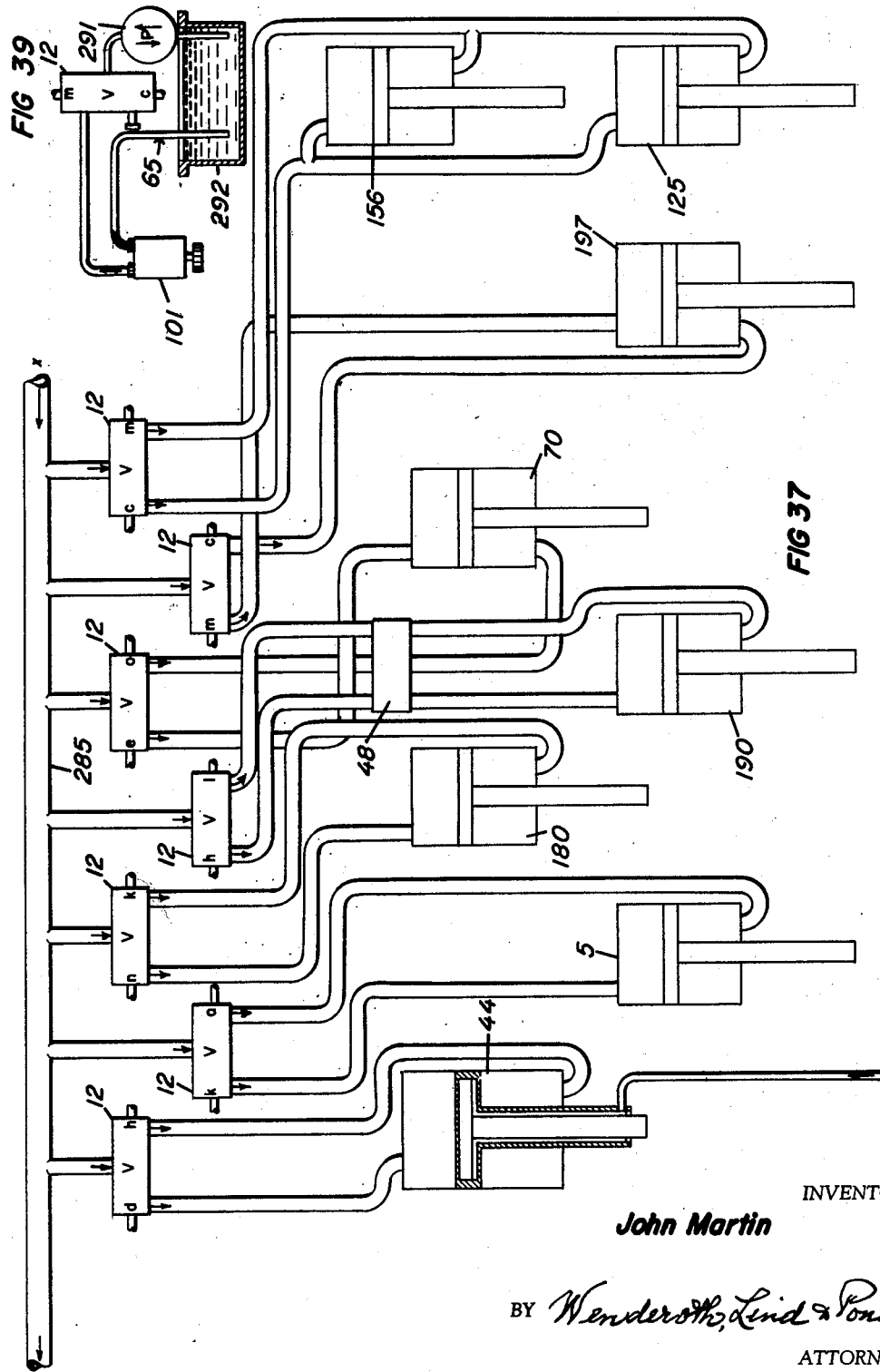
INVENTOR
John Martin
BY *Wenderoth, Lind & Ponack*
ATTORNEYS

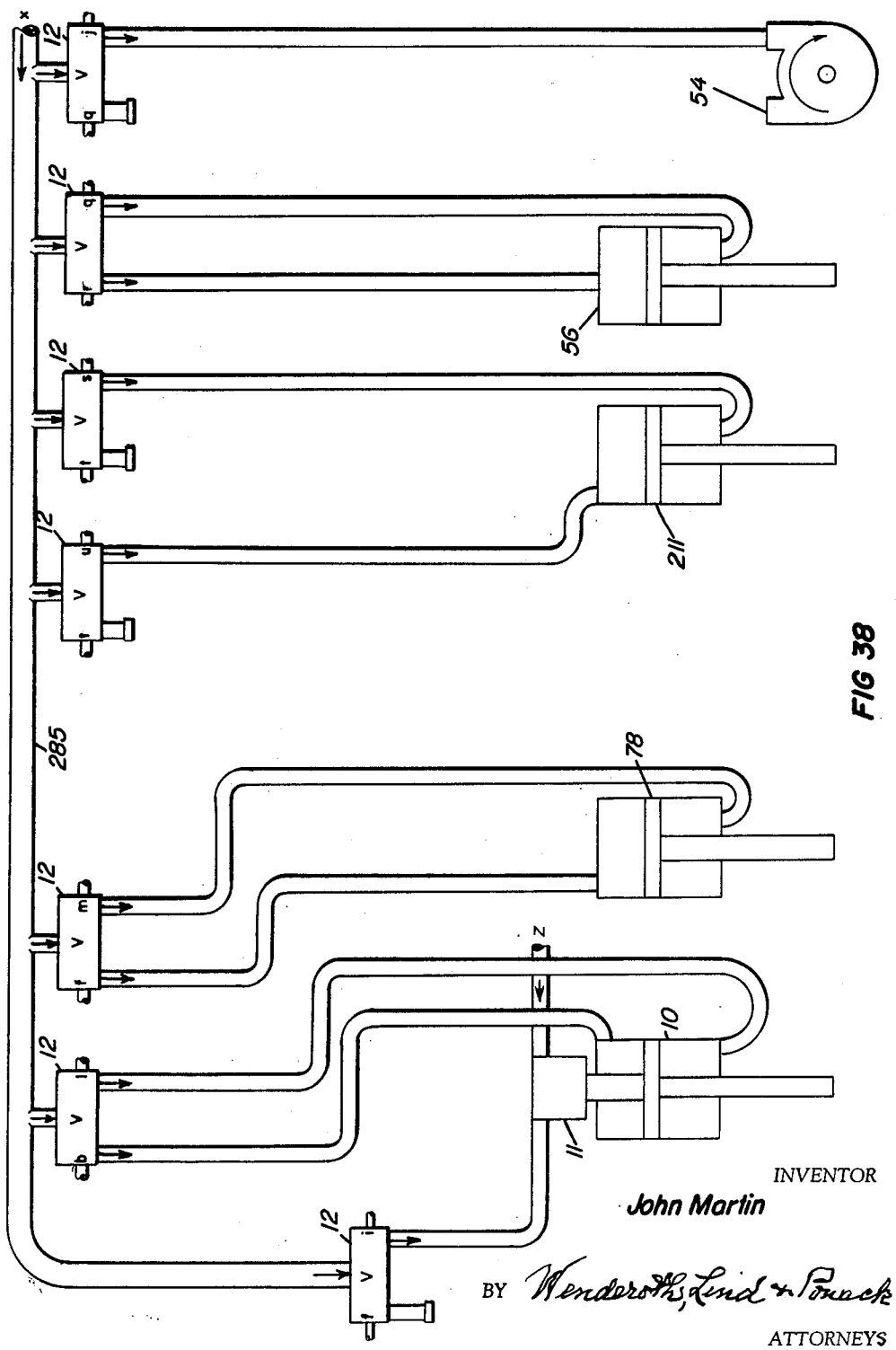

United States Patent Office 3,142,552
Patented July 28, 1964

3,142,552
MACHINE FOR FABRICATING SEAMLESS HIGH
OPTICAL QUALITY GLASS ARTICLES
John Martin, S. Chocano 301, Col. Anahuac,
Monterrey, Nuevo Leon, Mexico
Filed Oct. 30, 1959, Ser. No. 849,928
8 Claims. (Cl. 65—229)

This application is a continuation-in-part of my application Serial No. 319,001, filed November 6, 1952, entitled "Machine for Fabricating Seamless High Optical Quality Glass Articles," now abandoned.

The present invention relates to a construction for fabricating seamless glass articles having a high optical quality produced with a process known as "paste mold" (the mold's inner surface is coated with carbonized organic matter) in different sizes and forms with an exact and precise control over the various movements.

An object of the invention is to provide a construction which may be sectional and stationary with the loading point common to all the sections or independent. The various sections may be arranged in a polygon, a circle, a semi-circle, a V-shaped form or in line.

A further object of the invention is to provide means for applying a plunger to form a preform of the glass article in a blank mold at a desired pressure with a pneumatic cushion action.

A still further object of the invention is to provide a construction whereby the pressure of the plunger in forming a pre-form may be changed at any time without stopping the operation of the machine.

A still further object of the invention is to provide means whereby the extent of movement of the parts involved is held at a minimum.

With the above and other objects in view which will become apparent from the following description and claimed in the claims, a preferred form of construction is shown in the drawings, in which:

FIGURE 5 is a cross-sectional view of the plunger construction for applying the pressure for forming a pre-form in the blank mold.

FIGURE 5a is a cross-sectional view with parts in elevation of the plunger shown in FIGURE 5 in another operating position.

FIGURE 6 is a cross-sectional view of the top portion of the cylinder for the plunger of FIGURES 5 and 5a illustrating particularly the various ports therein for the air pressure.

FIGURE 7 is a cross-sectional view of the blow head mechanism and the blow mold with certain parts shown in elevation.

FIGURE 8 is a top plan view of the mechanism shown in FIGURE 7 with certain parts shown in section.

FIGURE 9 is a cross-sectional view of the neck ring mechanism and the hydraulic motor for rotating the same.

FIGURE 10 is a cross-sectional view of the neck ring mechanism and cooperating parts with certain elements shown in dotted lines for greater clarity.

FIGURE 11 is a bottom plan view of the construction shown in FIGURE 10.

FIGURE 12 is a cross-sectional view with parts in elevation showing the mechanism for closing and opening the blow mold.

FIGURE 13 is a plan view of the mechanism shown in cross-section and showing the blow mold in dotted lines in two operating positions.

FIGURE 14 is a cross-sectional view taken upon section line 14—14 of FIGURE 16a looking in the direction of the arrows.

FIGURE 15 is a cross-sectional view taken upon section line 15—15 of FIGURE 16a looking in the direction of the arrows.

FIGURE 16 is a cross-sectional view of the blank mold construction with its retaining basket and the means for operating the same taken upon section line 16—16 of FIGURE 17.

FIGURE 16a is a view of the construction shown in FIGURE 16 with parts shown in elevation, taken upon section line 16a—16a of FIGURE 17.

FIGURE 17 is a bottom plan view of the construction shown in FIGURE 16.

FIGURE 18 is a cross-sectional view with parts in elevation showing the means for actuating the scoop.

FIGURE 19 is a cross-sectional view taken upon section line 19—19 of FIGURE 20.

FIGURE 20 is an elevational view showing particularly the means for covering the blank mold.

FIGURE 21 is a top plan view of FIGURE 20 with parts shown in section.

FIGURE 22 is a cross-sectional view with parts in elevation showing a form of oscillator for swinging the channels in and out of delivery position.

FIGURE 23 is a top plan view of the construction shown in FIGURE 22.

FIGURE 24 is a cross-sectional view of four way valve or distributor valve.

FIGURE 24a is a cross-sectional view taken upon section line 24a—24a of FIGURE 24 looking in the direction of the arrows.

FIGURE 24b is a cross-sectional view taken upon section line 24b—24b looking in the direction of the arrows.

FIGURE 24c is a side elevational view of the distribution valve shown in FIGURE 24 with parts broken away.

FIGURE 25 is a cross-sectional view of a pilot valve together with a partial elevational view of the timing drum and a button fixed thereon.

FIGURE 30 is a cross-sectional view illustrating the insertion of a gob of glass into the blank mold.

FIGURE 31 is a cross-sectional view with parts in elevation illustrating the formation of the preform.

FIGURE 32 is a cross-sectional view showing the next step in the operation where the pressing plunger has been withdrawn and also the blank mold, illustrating a stretching of the preformed article while rotating the same.

FIGURE 33 is a cross-sectional view with parts in elevation illustrating the next step of the operation wherein the blow mold is placed in position about the preformed article while such article is being stretched and rotated.

FIGURE 34 is a partial cross-sectional view illustrating the formation of the article in th blow mold during blowing and while rotating.

FIGURE 35 is an elevational view illustrating the release of the neck ring after the blow mold has been removed whereby the finished ware is released.

FIGURES 36, 37 and 38 are diagrammatic showings of the pneumatic and hydraulic conduits and controls for operating in proper sequence the various mechanisms of the machine, and FIGURE 39 is a diagrammatic view of the hydraulic system for operating a hydraulic motor.

In the various figures of the drawings, like reference numerals are used to indicate like parts.

Figure 1:
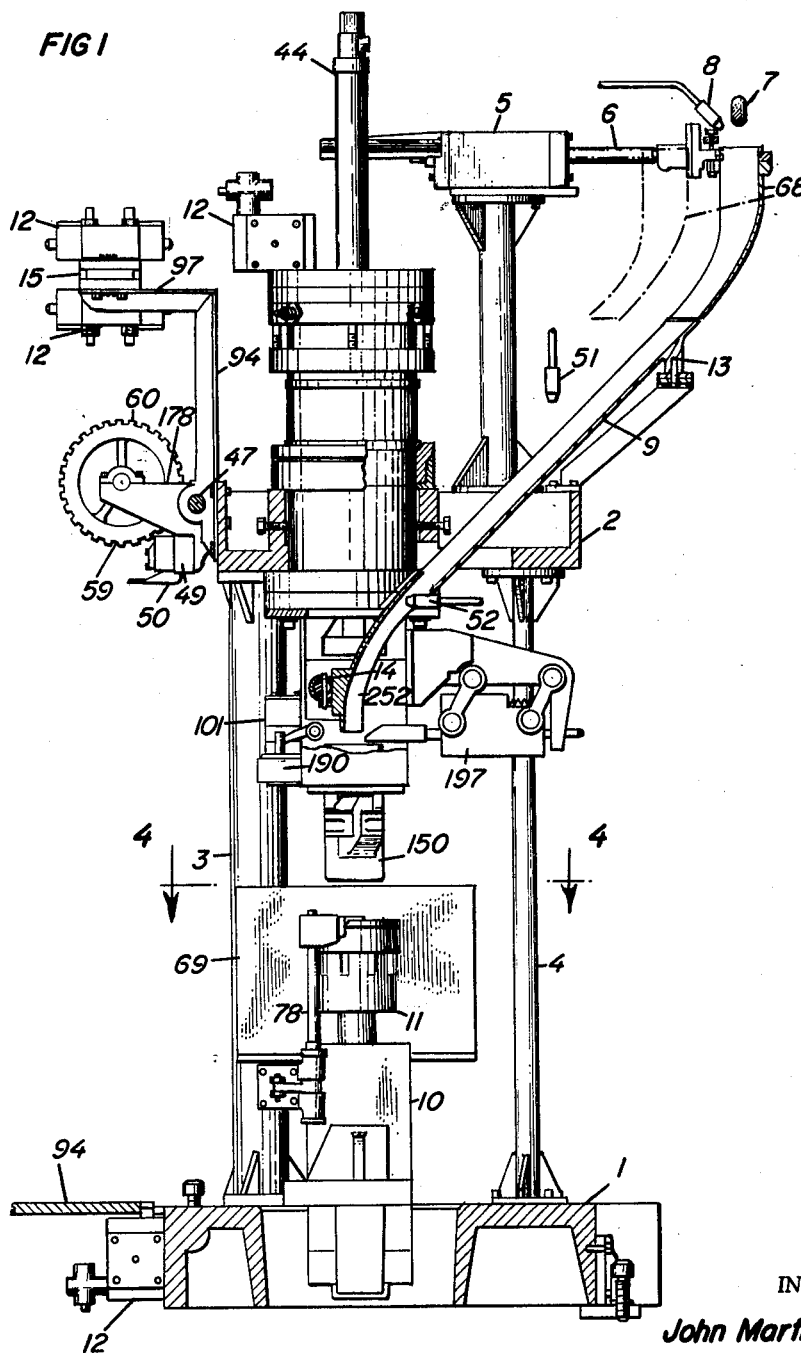
FIGURE 1 is a side view of one of the sections of the machine with parts shown in cross section and with some parts removed for greater clarification.

The machine shown in the drawings comprises primarily a bottom base 1 and a table 2 interconnected by means of the columns 3 and 4. Upon this framework the various other mechanisms are supported.

Figure 2:
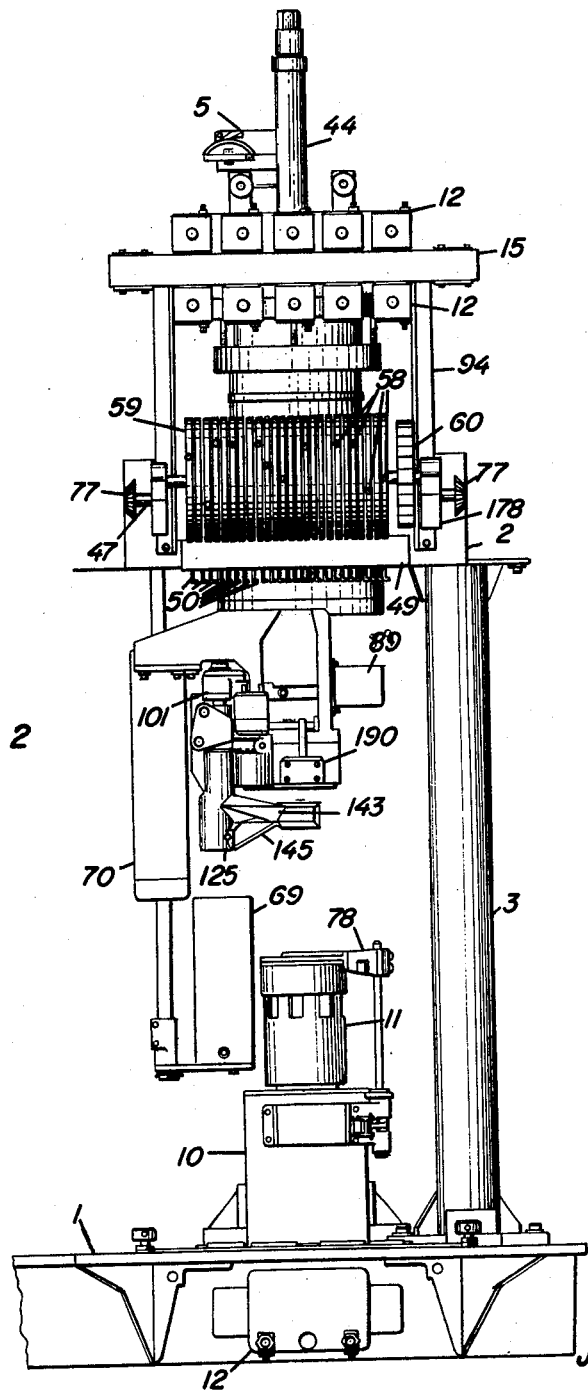
FIGURE 2 is a front view of the section shown in FIGURE 1 with certain parts removed.
Figure 3:
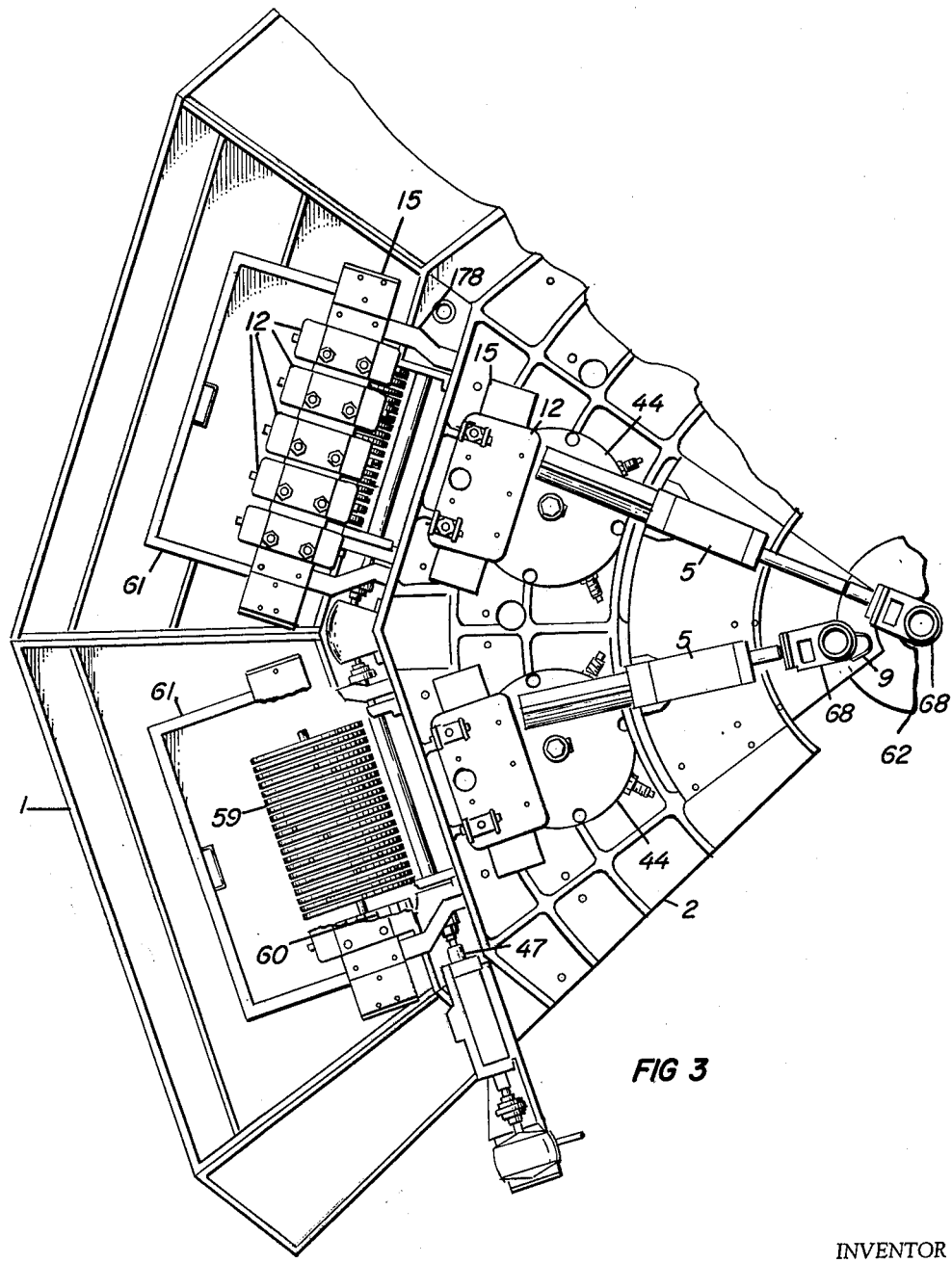
FIGURE 3 is a top plan view showing two adjacent sections of a machine having the various sections arranged in octagon shape with parts removed.
Figure 4:
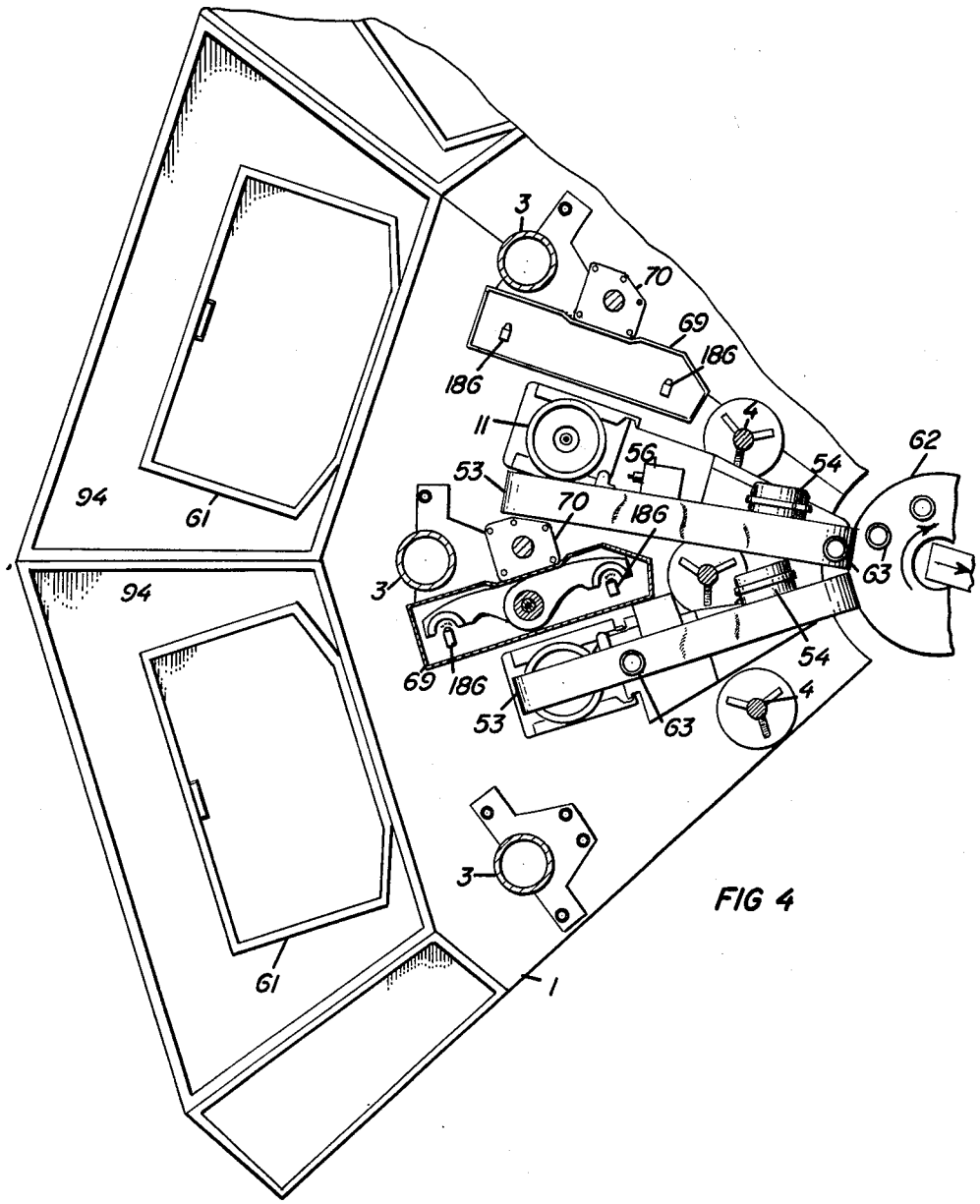
FIGURE 4 is a cross-sectional view taken upon section line 4—4 of FIGURE 1 with parts removed.

FIGURES 1 and 2 show the main features of a single section while FIGURES 3 and 4 show a pair of adjacent sections of a decagonal shaped battery of sections wherein if desired ten different types of glass ware may be made simultaneously. The arrangement of the sections may be any shape desired and may constitute as many sections as desired, each capable of constructing a specified type of glassware. The description below will be confined to a single section such as is shown in FIGURES 1 and 2.

A metered gob 7 of molten glass is applied to a movable scoop 68 and from this scoop it passes to a channel 9 into a blank mold indicated generally at 10. The scoop 68 is movable from the center of the machine in each section as shown in dotted lines in FIGURE 1. There is one scoop 68 for each section and a mechanism 5 is provided to reciprocate such scoop between its two end positions as shown in FIGURE 1.

For removing the glassware when finished there is a takeout mechanism comprising an oscillator 56, a conveyor belt 53, a conveyor drive motor 54 and a rotary table 62 from which the glassware may be further conveyed as desired. The finished ware is indicated at 63 and the conveyor belt is oscillated by means which will be described below with respect to the release mechanism. After the belt 53 has received the ware it will oscillate backwardly away from the mechanism 10.

The blow mold is shown at 150 and a water tank which reciprocates upwardly and downwardly is indicated at 69. A catwalk extending around all the sections is shown at 94.

A timing drum 59 having a gear 60 is driven from the drive shaft 47. The timing drum 59 is equipped with knobs 58 which are located so as to operate the various mechanisms in proper sequence.

In order to properly lubricate the scoop 68 and the channel 9 for the passage of the gob of molten glass a jet spray 8 for depositing an oil and water emulsion on the scoop 68 is provided. The channel 9 is lubricated from the jet 51 and the curved part 252 of the channel 9 is lubricated from the jet 52. Distributor valves 12 are provided in order to control the operation of the plunger mechanism.

*The Plunger Mechanism*

Figure 26:
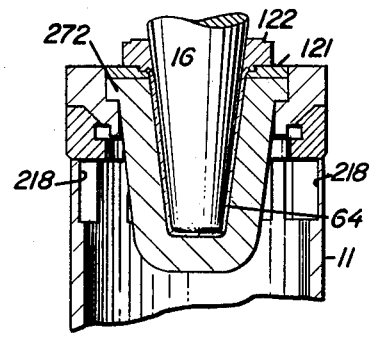
FIGURE 26 is a partial cross-sectional view of the blank mold showing a portion of the pressure plunger in forming the pre-form.

The plunger mechanism for actuating the plunger 16 in order to form the preform in the blank mold as shown in FIGURES 26, 30 and 31 is shown in FIGURES 5, 5a and 6.

The plunger mechanism indicated generally at 44 comprises a cylinder 27 in which a piston 18 is reciprocal. The piston 18 is mounted upon a hollow shaft 35 at its upper portion. The piston 18 is itself hollow as shown forming the air cushioning space 32 in which the piston 254 upon hollow shaft 34 and its extension 274 is positioned. Within hollow shafts 34 and 274, passing through both pistons is the plunger head shaft 17 to which the plunger head 16 is attached. The piston 18 may be moved downwardly by the hollow shaft 35 when air enters the ports 55 as shown more particularly in FIGURE 6. When piston 18 moves downwardly it carries with it piston 254 until seating upon the insert "a." Meanwhile the plunger 16 makes contact with glass in the blank mold, injecting glass upward due to the force exerted by predetermined air pressure in a chamber 32. The pressure in the air space 32 is supplied through the passage 33 existing between the hollow shafts 35 and 34. This pressure is regulated by means of a reduction valve 40 and a manometer 41 upon the line 275 from a suitable air supply. 39 is a filter. By this control of the air cushion 32 it will be seen that the pressure existing in the cushioning space 32 may be adjusted even while the machine is operating.

Ordinarily the pressure of air in order to move the entire mechanism is from 30 to 60 pounds per square inch but the controlled air pressure within the cushioned space 32 is only from a few ounces to about 10 pounds per square inch. This pressure operation is an exceedingly delicate operation and must be accomplished with the utmost accuracy. The pressure for small tumblers for instance is about 5 ounces while for larger tumblers the pressure may be four or five pounds. This is because the various molds used are not exactly the same. As a general rule the operation is carried out with the lowest pressure possible. If it were necessary to stop the machine in order to correct the pressure to be applied by the plunger then the plunger would cool and such plunger should ordinarily have a rather high temperature. In order to move the piston 18 upwardly air is admitted into the passage 26 and from thence through the bores in the casting 28 to an annular groove 30 and from there downwardly through the bore 28′ and into a passage 253 located at the bottom of the cylinder 27.

The sleeve 34 is provided as mentioned above at its lower end with a piston 254 which forms a part of the cushioning means. The rod 17 to which the plunger 16 is attached is provided with a central bore 38 which communicates on one hand with the air inlet 36 and on the other hand with the outlet ports 46 provided upon the plunger head 16. This constitutes the cooling air for the plunger. A cap nut is indicated at 43 and is seated upon the air admission collar 42. The top plate of the cylinder is shown at 29 with the intermediate head plate at 23. The bottom head plate is shown at 20 and by the various ports and annular passages the conduits for the air are provided.

A head assembly ring is shown at 21 and a cooling air inlet collar at 42.

*The Blow Head Positioning Cylinder, the Neck Ring Release Mechanism and Means for Moving Channel 9*

The above mechanisms are shown in FIGURES 7 and 8. FIGURE 7 is a side view of the three mechanisms involved and FIGURE 8 is a top view. The blow head positioning cylinder is generally indicated at 197 and comprises a cylinder 202 supported by the links 276 on the pivots 203. The cylinder is normally urged to its forward position by the spring 205 until it contacts a stop 204 bolted upon the frame 198. When air is admitted through the port 256 the piston 199 will move to the left in the cylinder 202 as shown in FIGURE 7. The piston 199 carries with it a piston rod 201. At its left hand position the rod 201 has mounted thereon the blow head 200. At its right hand it carries a stop member 210.

In the frame 198 there is provided a slot 209 in which the piston rod 201 travels but which is too narrow to admit the passage of the stop member 210. Therefore when the piston head 199 has completed its travel through the cylinder 202 the stop member will abut against the frame 198. At this point the blow head 200 is located substantially over the blow head seat 115 but due to the position of the cylinder it is slightly above the same.

However, as the piston 199 can still travel to the left in the cylinder it will tend to pull the cylinder 202 backwardly against the pressure of the spring 205 and therefore move downwardly on the pivots 203 and seat the blow head on the blow head seat 115.

When air is admitted through the port 255 then the above process will substantially be reversed. In the rod 201 there is provided a bore 206 and in the cylinder there is a bore 257. The bore 257 communicates with an air inlet 208. When the cylinder and the rod are in the position when the blow head is seated on the seat 115 then and only then will there be air passing from 208 through the blow head 200. A necessary condition is that before air is admitted through the passages 206 the blow head must be properly seated upon the seat 115.

The neck ring release mechanism comprises a piston located generally at 190. A cylinder 191 is provided with a piston 258 carried by a piston rod 192. A lever 193 connected to the piston rod 192 pivots a shaft 194. This pivoting shaft 194 has mounted thereon arms 195 which bear upon a plate 116 which will actuate the neck ring mechanisms as explained below. The locking screws 196 secure the arms 195 to the shaft 194. In order to actuate the piston 258 air ports 259 and 260 are provided upon the cylinder 191.

Referring to FIGURE 1 the channel 9 is pivotally mounted upon the pin 13 at the top thereof and upon the pin 14 at its lower end. The channel 9 is oscillated by a piston 180 reciprocating in a cylinder 182. Fixed to the piston 180 is a piston rod 183 surrounded by a sleeve 184. The sleeve 184 is provided with a notch 185 into which the pivot pin 14 fits. As the piston 180 moves in the cylinder as shown in dotted lines in FIGURE 8 the pivot pin 14 will likewise be reciprocated. Its motion will carry the channel 9 into the position shown in dotted lines in FIGURE 8 but it will also pivot on the pin 13 and therefore will pivot the channel 9 upwardly at its top and at its bottom end. There is a cut-out portion 31 in the plunger mechanism 44 in order to accommodate this movement of the channel 9.

*The Neck Ring Mechanism*

In FIGURE 9 the neck ring mechanism together with the cooperating elements is shown. The hydraulic motor indicated generally at 101 comprises a shaft 105, and a collar 104 fixed to the shaft by a key 106. The collar 104 is provided with a plurality of spaced bores 261 in which are located the pins 103. The pins are slidably mounted in the bores and there are fluid inlets 102 and 102' which communicate with the bores 261.

In the housing 107 there is provided an inclined plane 108 in the form of a ball bearing. If fluid under pressure is admitted to inlet 102 and evacuated from 102' the pin 103 directly under the inlet 102 will be forced downwardly along the inclined plane 108. A pin 103 which is under 102' will be moved upwardly along the inclined plane 108. Since there are a plurality of these pins as long as pressure is applied as indicated the collar 104 will be rotated and the shaft 105 will also be rotated. A reverse rotation of the shaft may also be accomplished by reversing the pressure and evacuation applied to the pins 103. Also by a suitable control of the hydraulic pressure applied the shaft 105 may be rotated alternately clockwise and counterclockwise and thereby bring about a similar rotation of the neck ring. Lubricating inlets are shown at 111 and the shaft 105 is mounted in ball bearings 109.

At the lower end of the shaft 105 there is fixed a gear 112 which meshes with the idle gear 113. The idle gear 113 meshes with a ring gear 114 which transmits motion to a ring 117 which is an internally bifurcated torus. In FIGURE 11 the ring 117 is indicated in dotted lines. The bifurcations of the ring 117 serve as bearing points for the shafts 119 upon which the pivoting neck ring release arms 118 pivot. The neck ring 121 shown in FIGURES 9 and 10 in dotted lines for greater clarity is secured to the pivoting arms 118 by the bolts 120. This construction as shown is located below the blow head seat 115 and the neck ring release ring 116. When the arms 195 depress the ring 116 the springs 99 are compressed and the neck ring pivoting arms 118 will slide upwardly upon the inclined surface 262 provided at the lower side of the ring 116. The springs 99 act as return springs for returning the ring 116 to the position shown in FIGURE 9 upon release of the pressure by the arms 195 upon the ring 116.

The gear 114 is fixed to the ring 117 and a coil spring 123 shown particularly in FIGURE 11 encircles the lower portion of the neck ring release arms 118. The spring 123 acts as a return spring for returning the arms 118 to the position shown in FIGURE 9 upon upward movement of the release ring 116. The springs 124 act upon the L-shaped ring, that serve as a spring-loaded bias, to secure intimate contact between neck ring 121 and the face of blank mold 272, during the preforming operation. The inward action of the arms 118 upon the neck ring 121 is restrained by the contact of the neck ring with the neck ring guide 122 when such ring is positioned in its normal operating position.

*The Blow Mold Operating Mechanism*

In FIGURES 12 and 13 there is shown at 125 the mechanism for opening and closing the blow mold as well as the mechanism for actuating the bottom seal plate 149 for the blow mold. The blow mold has two retaining arms 143 and 145 and in FIGURE 13 the two positions to which the actuating means moves these arms are shown in dotted lines.

The means for lifting the bottom seal plate 149 comprises the set screw 151 which is threaded into the arm 147. The head of the set screw 151 is secured to the bottom seal plate 149 in any desired way. The arm 147 is fixed to the shaft or central piston 126 and is keyed thereto in the keyway 148. The top of the shaft 126 is provided with a cap 277 and directly below the cap 277 is a piston 131 which is secured to the shaft 126 by the pin 137 and is secured to the cap 277 by the bolt 278. The piston 131 is located within the cylinder 156 and is connected to the sleeve 279 by a bolt 280. The lower end of the sleeve 279 has a gear 140 which meshes with a rack 134. Upon movement of the piston 131 the gear 140 may slide transversely to the rack 134 in the space provided therefor. Movement of the piston 131 by air entering the inlet 36 will cause a downward movement of the shaft 126 thereby releasing the seal 149 from the bottom of the blow mold and when air is injected through the port 133 below the piston 131 a movement of the shaft 126 upwardly will close the bottom of the blow mold with the seal 149. In addition to this downward and upward movement of the seal 149 it is necessary to move the seal 149 out of the range of the blow mold, that is laterally to one side or the other. This is accomplished by the subsequent movement caused by interaction between the gear 140 and the rack 134.

In FIGURE 13 which is a bottom view of the mechanism shown in FIGURE 12 there is shown a cylinder 156 in which a piston 153 reciprocates. Fixed to the piston 153 is a piston rod 152 which at one end carries a plate 138. The plate is fixed to the piston rod 152 by means of a pin 281. The plate 138 has a configuration as shown in FIGURE 12 and mounted upon this plate are the three racks 134, 135 and 136. The racks 134 and 136 are located at one side of the shaft 126 while the other rack 135 is located at the opposite side and intermediate the distance between 134 and 136.

The rack 134 as mentioned above meshes with the gear 140. The rack 135 meshes with a gear 141 which is on a sleeve 127 rotatably mounted upon the shaft 126. The sleeve 127 is fixed to the lower blow mold retaining arm 145 by means of the set screw 146.

Meshing with the rack 136 is a gear 142 provided upon the sleeve 129 mounted rotatably upon the sleeve 127. Fixed to the sleeve 129 by means of the set screw 144 is the other blow mold retaining arm 143. Lubricating fittings are indicated at 130.

When air is admitted or exhausted through the air inlet and outlet 155 causing a movement of the piston 153 the racks 134, 135 and 136 will be actuated in one direction or the other thereby causing a movement of the blow mold arms 143 and 145 as shown in FIGURE 13 in dotted lines.

The racks 134, 135 and 136 are interconnected at the end opposite the plate 138 by a plate 282 which may be of the same configuration as the plate 138. The racks are secured to the plates 138 and 282 by means of nuts 139. The racks 135 and 136 are diametrically opposed with relation to the gears 141 and 142. A movement of the piston 153 therefore will impart to the gears an equal and an oppositely directed movement. As shown, such movement involves a 90° rotation of each retaining arm so as to place the arms 143 and 145 180° apart when they are released. This permits an easier emersion of the arms in the water tank to be explained later. The operation involves the admission of air through the ports 130 and 133 in order to actuate the piston 131 for securing the proper movement of the seal plate 149 to and away from the blow mold. Then a proper actuation of the piston 153 will bring about the proper sequential lateral oscillation of both the sealing plate 149 and the blow mold actuating arms 143 and 145.

The Blank Mold Mechanism

Referring to FIGURES 14, 15, 16, 16a and 17 the blank mold retaining basket is indicated generally at 11. This is secured to the top of a tubular piston shaft 236. The bottom of the basket is provided with a tubular stem 283 which fits within the tubular shaft 236 and is secured thereto by means of a pin 217. The stem 283 and the shaft 236 is provided with air inlets 212 for the cooling air for the bottom of the blank mold. Cooling air enters at the inlet 216 and the basket is provided with outlet windows 218 for the exit of the cooling air.

At the lower end of the tubular shaft 236 there is provided a piston 238. Referring to FIGURE 17 air inlets 233 and 234 are provided for moving the piston upwardly and downwardly in the cylinder 214. As shown by the flow lines in FIGURE 16 air for moving the piston 238 upwardly is admitted at 234 and passes through channel 225 to the lower side of piston 238. The air for lowering the piston is admitted at inlet 233 and passes through the channel 284 to the passage 235 in the casing 10 and from there to the annular channel 226 at the top of cylinder 214 from which it passes through the outlets 224 in the annular flange 213 at the upper portion of the cylinder 214. Means for adjusting the air escape from the cylinder is shown at 219.

In order to cushion the action of the piston 238 there is provided a sheet metal check valve both at the top and at the bottom of the cylinder 214. The check valve at the top is shown at 221 and the check valve at the bottom of the cylinder is shown at 220. The means for adjusting the escape of air is indicated at 219 with a square end 229 for manipulating the same.

The construction of the check valve 220 is shown more particularly in FIGURE 15 and comprises a sheet metal strip 221' with a bend 222' therein. The upper check valve 221 is provided with a bend 222 as shown in FIGURE 14. 223 indicate the bolts for securing the check valves to the casting 10. At 215 there is shown a cooling air control cock.

FIGURES 19, 20 and 21 show the construction for providing a covering mechanism and air inlet for the blank mold indicated generally at 78. The mechanism comprises a piston 79 reciprocating in a cylinder 80. The piston rod 82 is connected by a link 81 to a link 88 which in turn is connected by a hub 231 to a hollow rod 86 having an air passage 85 extending axially therethrough. At 266 and 267 holding means are provided for the rod 86 which are mounted on a fixed part of the frame. When the piston 79 is moved in one direction or the other by air through one of the ports 250 the links 81 and 88 will rotate the rod 86 and this rotation is transmitted to the clamping means 87 fixed at the top of the rod 86. Mounted upon the clamping means is a cover 83 of the form more particularly shown in FIG. 21. The cover 83 is normally tilted as shown in FIGURE 20 so that any stray water or foreign material that may happen to fall thereon will be deflected from it rather than fall into the blank mold basket 11. In addition, the air passage 85 provides cleaning air for the basket which passes from the passage 85 through the passage 227 into the passage 228 provided on the cover 83 and thence downwardly through an opening into the basket 11 and consequently to the blank mold.

A splined rod 237 is secured to the base of the cylinder 214 and extends upwardly passing through a plug 232 fixed by means of a screw to the bottom of the piston 238. This rod 237 is designed to prevent any rotation of the mechanism about its axis in order to arrest any tendency to rotate the basket.

The Scoop Actuating Means

In FIGURE 18 there is shown the scoop actuating means generally indicated at 5. It comprises a cylinder 242 in which reciprocates a piston 240 fixed upon the shaft 241. At one end of the shaft 241 there is provided a holding arrangement 264 which is fixed to the scoop 68. The bolts 245 secure the cylinder 242 to the frame of the machine. In order to actuate the piston 240 there are provided air outlets and inlets 246 and 246'. When the piston is in the position shown in FIGURE 18 air can only actuate the piston 240 by entering through the port 246'. However, a spring 265 will be compressed by the air and force the diaphragm 248 towards the piston so that the diaphragm 248 will register with the groove 247 and admit the flow of air around the diaphragm and into the cylinder 242 thereby moving the piston 240 until it passes the outlet 246 and thereafter air will pass directly through 246 and continue the movement of the piston 240 to the left in FIGURE 18.

When the piston 240 registers with the inlet 246 at the left hand side in FIGURE 18 then the air in front of the piston 240 can no longer escape through the left hand port 246. Also, air cannot escape through the port 246' because the diaphragm 248 at this side of the piston 240 blocks the passage of air therethrough. In this way there is provided a cushion of air in order to prevent any banging of the piston against the end walls of the cylinder 242.

At the left hand side of the cylinder 242 there is provided an arcuately shaped extension 243 which serves as a track for the guide 244 which is bolted to the shaft 241. This will prevent any rotation of the shaft 241.

The Deflector (Channel) Oscillator Mechanism

This mechanism is shown in FIGURES 22, 8, 7 and 23 and is indicated generally at 89. It comprises a cylinder 90 in which reciprocates a piston 180 mounted upon piston rod 183 in a guide sleeve 184. In a cut out portion upon the rod 183 there are provided ways 187 which are fixed by the set screw 188 fastened by the nut 189. There are provided two spaced projections 96 upon the ways integral with an insert 95 which is bolted to the rod 183 by the bolts 98. The object to be oscillated is indicated at 14.

When air is admitted through the ports 268 the piston 180 is reciprocated so as to provide the oscillation desired. At 269 a fixed portion of the frame is shown to which the oscillating mechanism is attached.

The Water Tank Raising Mechanism

Figure 27:
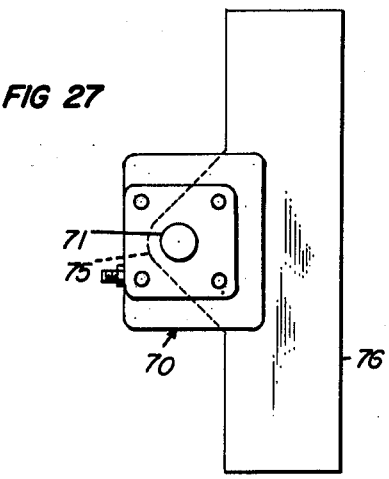
FIGURE 27 is a top view of the water tank and co-operating mechanism.
Figure 28:
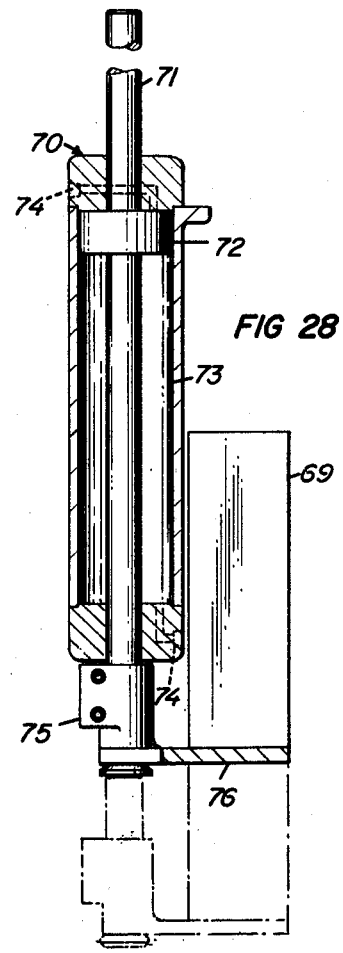
FIGURE 28 is a side view of the water tank together with the means for operating the same shown in cross section.

After each operation involving the blow mold such blow mold is immersed in the water tank 69. FIGURES 27 and 28 show the mechanism for raising the water tank in order to immerse the blow mold retaining arms 143 and 145. The raising mechanism for raising the water tank 69 so as to accomplish this purpose is indicated generally at 70. It comprises a cylinder 73 in which a piston 72 mounted upon piston rod 71 reciprocates. The lower end of the piston rod has secured thereto a clamp 75 which has secured thereto a table 76 for the water tank. Inlet and outlets 74 are provided for the air pressure to reciprocate the piston 72 and thereby move the water tank between the two positions indicated in FIGURE 28.

In FIGURE 4 the immersion tank showers are shown at 186.

Steps in Forming Glassware

FIGURES 26, 29 and 30 to 35 inclusive illustrate the various operations carried out by the above-described mechanisms in forming glassware.

In FIGURE 26 there is illustrated the blank mold basket 11 with the blank mold 272 located therein and the plunger head 16 after finishing the preform 64. The neck ring is indicated at 121 and the neck ring guide at 122.

Figure 29:
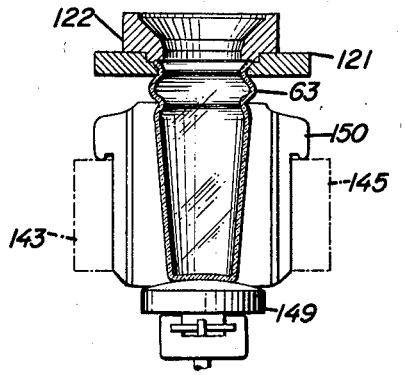
FIGURE 29 is a cross-sectional view with parts in elevation showing the blow mold.

FIGURE 29 illustrates a blown ware 63 in the blow mold 150 wherein it is held by the blow mold arms 143 and 145 while the neck ring 121 is shown located within the neck ring guide 122.

FIGURES 30 to 35 inclusive illustrate the actual steps from the preliminary gob of glass 7 to the finished article 63. In FIGURE 30 the curved portion 252 of the channel 9 has just deposited the gob of glass 7 within the blank mold 10. The channel 9 then withdraws withdrawing the curved portion 252 and the plunger head 16 descends as shown in FIGURE 31 to form the preform 64. Then the plunger head 16 is withdrawn allowing the preform to remain suspended as shown in FIGURE 32 while retained by the neck ring 121. At this time the preform is rotated for stretching thereof. Then as shown in FIGURE 33 the blow mold comes into position about the preform 64 and air pressure is supplied to bring the preform into the shape shown in FIGURE 34. Upon removal of the blow mold 150 the finished glassware 63 as shown in FIGURE 35 is maintained temporarily suspended by the neck ring 121, and then released to the takeout conveyor 53 which is rotated by the takeout conveyor motor 54 while at the same time being oscillated by the takeout mechanism oscillator 56.

The Controls

The controlling means for operating the above described mechanisms in proper sequential order comprises the timing drum 59 having disposed thereon at predetermined locations the timing drum knobs 58 which cooperate with a series of pilot valves 50 indicated diagrammatically in FIGURE 36 from $V_a$ to $V_u$.

The pilot valves 50 in turn control the operation of a plurality of four-way or distribution valves 12 as illustrated diagrammatically in FIGURES 37 and 38. The distribution valves 12 then actually control the inlet and outlet of fluid through the various inlets and outlets controlling the movement of the mechanisms described above.

The construction of a pilot valve is shown in FIGURE 25 indicated generally at 50. It comprises a plunger 174 of the form shown urged to its upward position by a spring 175. The valve casing is indicated at 271 and when air is applied to the inlet 172 from the pilot valve manifold 49, if the plunger is in its upper position then no air will pass through the valve. However, if the timing drum moves one of its knobs 58 past the upper end of the plunger which will depress the plunger so that the enlarged portion at the inlet 172 will move away from the inlet and allow air to pass from the inlet to the outlet 173. From the outlet 173 the air under pressure will pass to its associated four-way or distribution valve 12. Since the timing drum is continuously rotating such a passage of air will occur only momentarily. Consequently the return spring 175 will return the piston or plunger 174 to its upper normal position. Any excessive pressure will exhaust through the port 171 and the cylinder 162 will thereby be exhausted. At 176 there is shown an emergency handle for the manual operation of any given part of the machine should circumstances make this necessary.

In FIGURES 24, 24a and 24b the construction of a four-way valve or distribution valve 12 is shown. This comprises two oppositely located piston cylinders 162 which are located at each side of the valve casing 163. A piston rod 158 extending through the valve casing 163 and also through the cylinders 162 has mounted thereon in such cylinders the pistons 270. The pistons 270 are secured by the pins 161 to the piston rod. The travel of a piston 270 is limited by a stop 160 and is controlled by the admission of air into the ports 166. The piston rod 158 is diminished in diameter at the two locations 159 leaving a central raised section 179 as shown in FIGURE 24. These reduced diameter portions will serve as passages for the air between different inlets and outlets as the pistons 270 are reciprocated. Located within the casing 163 is the valve proper 167 which is provided with the grooves 168. The grooves 168 are in communication with the channels 164 and 165. The channels 165 are connected to an air pressure manifold 15 which is common to a bank of four-way or distribution valves 12. Air can enter into one of the grooves 168 from the channel 165. Then depending upon the position of the piston rod 158 in the valve casing 163 this air from a groove 168 will be placed in communication with a channel 164 and from there to an outlet 169 shown in FIGURES 24a and 24b from which it passes to operate the particular mechanism with which it is associated. The pilot valves 50 of course must be associated with the timing drum but the distribution valves may be located in any suitable or convenient location provided proper conduits are established between the pilot valves 50 and the distribution valves 12.

Referring to FIGURE 36, the air main 285 with a pump shown at P supplies air under pressure to the atomizer 66. Into the atomizer 66 oil is fed through the pipe 286 from the tank 67 by means of the pump 287. The air in the air main 285 therefore is supplied with air under pressure in a lubricating mist.

The reduction valve 39 controls the air passing to the cushioning air chamber 32. Therefore at $y$ there is air under a controlled pressure which may be varied as indicated above at any time during the operation of the machine passing to the air chamber 32.

A distribution valve 12 marked $_pV_k$ which indicates that such distribution valve is controlled from pilot valve $V_p$ and pilot valve $V_k$ controls the air supplied to the jet sprays 51 and 52 through the branch 290. In addition a branch 273 is connected to the main 285 and this supplies air to the jet spray 8 and this jet spray is also provided with an oil and water emulsion from the pipe 288 which is also connected to the jet sprays 51 and 52 for lubricating the channel 9 and the scoop 68. From the connection indicated jet spray 8 for the scoop 68 is continuously in operation while jet sprays 51 and 52 for the channel 9 are intermittently operated since they are controlled by the distribution valve $_pV_k$. A branch 289 from the main 285 having air under a pressure $z$ supplies the cooling air for the blank mold. This cooling air is also supplied continuously since it is not controlled by a distribution valve.

In FIGURE 37 a bank of distribution valves 12 is shown having the indicia thereon indicating which pilot valves 50 control the same. The mechanisms controlled are shown diagrammatically. Valve $_dV_h$ controlled by pilot valves $V_d$ and $V_h$ controls the plunger mechanism indicated generally at 44. The valve $_kV_o$ controls the actuating means 5 for moving the scoop 68. The valve $_nV_k$ controls the piston 180 for oscillating the channel 9, the valve $_hV_i$ controls the neck ring depressing mechanism 190 and as diagrammatically shown at 48 is associated with an emergency manually operated valve for the neck ring operation. Valve $_eV_o$ controls the water tank raising mechanism 70. Valve $_mV_c$ controls the blow head mechanism and valve $_cV_m$ controls the actuating cylinder 125 for the mechanism for opening the blow mold and the blow mold cylinder 156. The mechanism 125 will operate in unison with 156 since one controls the bottom seal 149 and the other the motion of the arms 143 and 145.

In FIGURE 38 the valve $_fV_i$ controls the movement of the blank mold basket and valve $_bV_l$ controls the operation of the blank mold 10. Valve $_fV_m$ controls the operation of the blow mold cover. Valves $_tV_m$ and $_tV_s$ control the operation of the takeout mechanism 211. Valve $_rV_q$ controls the operation of the takeout oscillating mechanism 56. Valve $_qV_j$ controls the operation of the takeout conveyor motor 54. $x$ indicates the air pressure prevailing in the main 285 which carries its oil and water emulsion.

In FIGURE 39 the hydraulic means indicated generally at 65 for operating the motor 101 is shown. This means is controlled by the distribution valve $_mV_c$ which is connected to the pump 291 drawing hydraulic fluid from the tank 292. The feed of the fluid to the pump may be reversed by the operation of the above mechanism.

The conduits connecting the valves to the various instrumentalities are connected to the various inlets and outlets previously described.

In view of the circular arrangement the length of the delivery equipment is the same for all sections. This means that all the gobs will stretch the same amount during delivery and in operation there is no difference from one section to the other.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

I claim:

1. A sectional and stationary machine for making seamless glass articles of high optical quality comprising a blank mold, a neck ring mounted rotatably above said blank mold at a fixed position, means for raising said blank mold against the bottom of said neck ring, means for preforming a glass gob in said blank mold, said means raising said blank mold also withdrawing said blank mold leaving said preformed gob suspended from said neck ring, means for rotating said neck ring, a blow mold mounted at a stationary location adjacent said neck ring having sections movable to closed and open position about said preformed gob on said neck ring and means for supplying pressure air to said blow mold to form the finished article from said gob so that said rotation of said preformed gob and formation to finished article take place at the location where sadi glass gob is preformed.

2. A machine as set forth in claim 1 wherein a scoop and a laterally movable cooperating channel are provided for guiding a gob of glass to said blank mold.

3. A machine as set forth in claim 1 wherein compressed air means are provided for cleaning said blank mold.

4. A machine as set forth in claim 1 wherein said means for rotating said neck ring comprises a gear and a hydraulic motor for driving said gear.

5. A stationary machine for making simultaneously a plurality of different shapes but same weight articles of high optical quality at the same time as set forth in claim 1 wherein a plurality of sections are located adjacent one another, a timing drum is provided for each of said sections, the timing drums of all sections being rotated in unison, and pneumatic means controlled by said timing drums are provided for carrying out the various operations in each section in different timing sequences to accommodate the timing operations of each article in each section.

6. A machine as set forth in claim 1 wherein means are provided for immersing said blow mold in water for cooling the mold and for humidifying the carbonaceous coating within the mold.

7. A sectional and stationary machine for making seamless glass articles of high optical quality comprising a blank mold, a neck ring mounted rotatably above said blank mold at a fixed position, means for raising said blank mold against the bottom of said neck ring, an air cushioned plunger for preforming a glass gob in said blank mold, said means raising said blank mold also withdrawing said blank mold leaving said preformed gob suspended from said neck ring, means for rotating said neck ring, a blow mold mounted at a stationary location adjacent said neck ring having sections movable to closed and open position about said preformed gob on said neck ring, and means for supplying pressure air to said blow mold to form the finished article from said gob so that said rotation of said preformed gob and formation to finished article take place at the location where said glass gob is preformed.

8. A sectional and stationary machine for making seamless glass articles of high optical quality comprising a blank mold, a neck ring mounted rotatably above said blank mold at a fixed position, means for raising said blank mold against the bottom of said neck ring, an adjustable air cushioned pressing plunger for preforming a glass gob in said blank mold, said means raising said blank mold also withdrawing said blank mold leaving said preformed gob suspended from said neck ring, means for rotating said neck ring, a blow mold mounted at a stationary location adjacent said neck ring having sections movable to closed and open position about said preformed gob on said neck ring, and means for supplying pressure air to said blow mold to form the finished article from said gob so that said rotation of said preformed gob and formation to finished article take place at the location where said glass gob is preformed.

References Cited in the file of this patent

UNITED STATES PATENTS

| | | |
|---|---|---|
| 1,529,661 | Miller | Mar. 17, 1925 |
| 1,865,967 | Schoonenberg | July 5, 1932 |
| 1,931,375 | Cook et al. | Oct. 17, 1933 |
| 2,225,948 | Beatty | Dec. 24, 1940 |
| 2,393,265 | Richardson et al. | Jan. 22, 1946 |
| 2,637,944 | Claughsey | May 12, 1953 |
| 2,645,059 | Rowe | July 14, 1953 |